United States Patent
Papuchon et al.

(10) Patent No.: US 7,126,110 B2
(45) Date of Patent: Oct. 24, 2006

(54) OPTRONIC PASSIVE SURVEILLANCE DEVICE

(75) Inventors: Michel Papuchon, Villebon/Yvette (FR); Philippe Antier, Le Bretonneux (FR); Ludovic Perruchot, Bonnelles (FR); Alain Verdaguer, Elancourt (FR)

(73) Assignee: Thales, Neuilly sur Seine (FR)

( * ) Notice: Subject to any disclaimer, the term of this patent is extended or adjusted under 35 U.S.C. 154(b) by 288 days.

(21) Appl. No.: 10/491,339

(22) PCT Filed: Oct. 1, 2002

(86) PCT No.: PCT/FR02/03342

§ 371 (c)(1),
(2), (4) Date: Jul. 29, 2004

(87) PCT Pub. No.: WO03/029876

PCT Pub. Date: Apr. 10, 2003

(65) Prior Publication Data

US 2004/0246548 A1  Dec. 9, 2004

(30) Foreign Application Priority Data

Oct. 2, 2001  (FR) .................. 01 12667

(51) Int. Cl.
*H01J 3/14*  (2006.01)
(52) U.S. Cl. .................. 250/234; 250/503.1; 250/334; 250/DIG. 1; 359/196; 359/554; 359/555; 359/556; 359/557
(58) Field of Classification Search ................ 250/234, 250/334, DIG. 1; 359/196, 554, 555, 556, 359/557
See application file for complete search history.

(56) References Cited

U.S. PATENT DOCUMENTS

| 4,427,260 A | 1/1984 | Puech et al. |
|---|---|---|
| 4,431,917 A | 2/1984 | Gibbons |
| 4,837,451 A * | 6/1989 | Pinson .................... 250/208.1 |
| 5,160,991 A | 11/1992 | Delacourt et al. |
| 5,249,075 A | 9/1993 | Delacourt et al. |
| 6,307,623 B1 | 10/2001 | Papuchon et al. |

FOREIGN PATENT DOCUMENTS

| FR | 2 739 192 A | 3/1997 |
|---|---|---|
| WO | 86 03916 A | 7/1986 |

* cited by examiner

*Primary Examiner*—David Porta
*Assistant Examiner*—Djura Malevic
(74) *Attorney, Agent, or Firm*—Lowe Hauptman & Berner LLP

(57) ABSTRACT

The present invention relates to an optronic passive surveillance device, especially for infrared surveillance.

Figure 1:
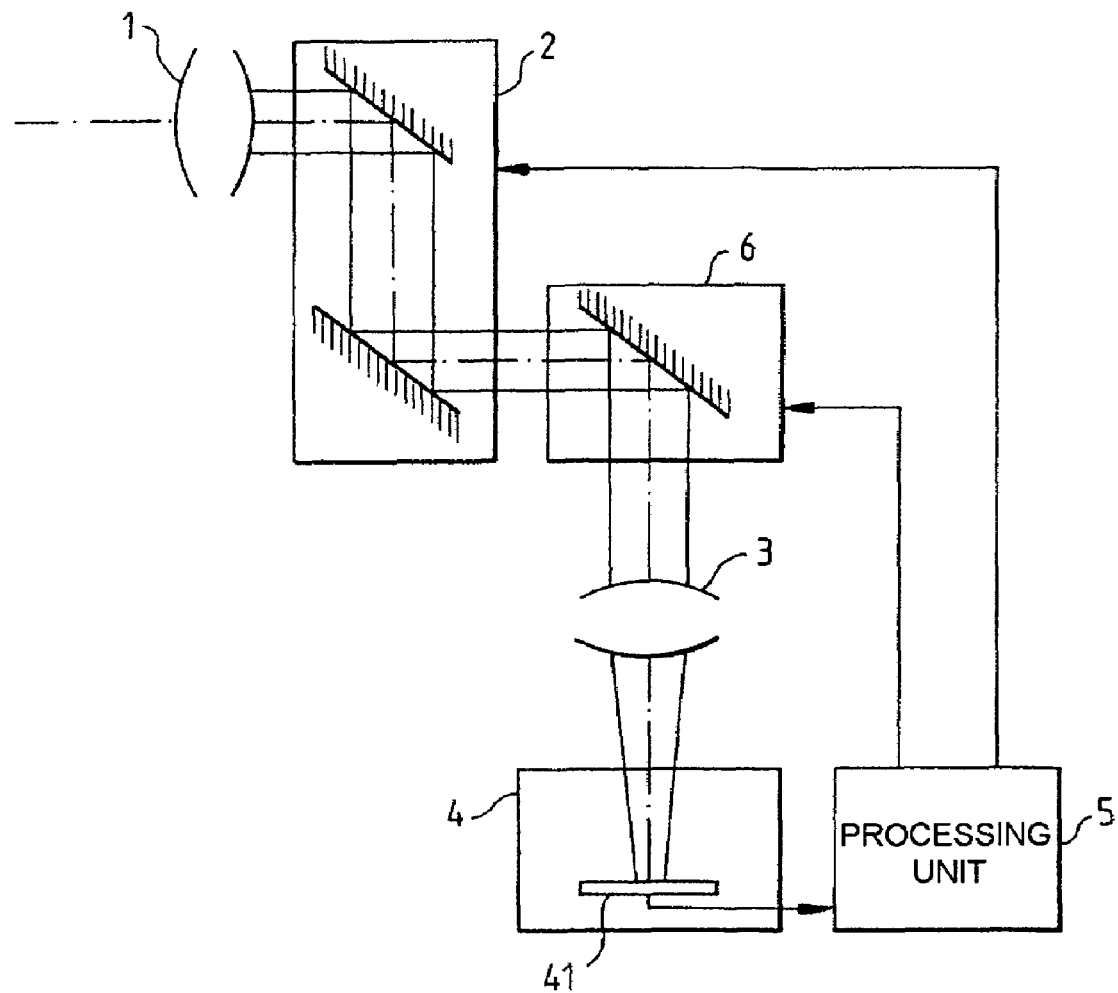

It comprises a front optic (1) of given useful instantaneous field, means (2) for scanning a scene with a given total field of observation, means (3) for forming the image of the scene and means (4) for detecting said image.

According to the invention, the detection means (4) comprise a two-dimensional matrix detector (41), the field of the detector along each of the dimensions being greater than or equal to said useful instantaneous field of the front optic along said dimension, and allow the acquisition, for each elementary area of the scene corresponding to the useful instantaneous field of the front optic, of N subimages formed on said detector (N≧1), with a given integration time for each subimage.

The device furthermore includes counterscanning means (6) making it possible to compensate for the movements of the image that are due to the scanning of the scene during the acquisition of the N subimages.

20 Claims, 3 Drawing Sheets

OPTRONIC PASSIVE SURVEILLANCE DEVICE

The present invention relates to an optronic passive surveillance device intended in particular to be installed on an aircraft in order to detect potential threats.

Optronic passive surveillance devices are particularly useful from the operational standpoint as these are systems that do not require emission of radiation, and they are therefore stealth devices. In such a system, it is necessary to be able to make an observation in an often wide field, whereas the front optic of the device has a limited useful instantaneous field. It is therefore necessary to use scanning means to be able to observe the scene over the entire field of observation, the scanning patterns being optimized in particular according to the total field of observation and to the scan rate.

In infrared surveillance systems for example, the detectors typically used are based on geometries of the type consisting of linear arrays of detectors that are sensitive in the 3–5 μm band or in the 8–12 μm band. In most existing systems, these are linear arrays of M×Q individual sensitive detectors, also called pixels, for example 288×4 pixels. Thanks to the scanning device, the total field to be observed is scanned by the linear array of detectors that remains stationary in the system. By having linear arrays of M×Q pixels (288×4 in the example given), it is possible to scan an elementary field with M (for example 288) points in one direction and to build up the information given by the Q (for example 4) points in the other direction, in such a way as to improve the signal-to-noise ratio of the detection so as to obtain a higher overall sensitivity, and therefore a greater detection range.

However, the degree of accumulation possible is limited by the number Q of points over which it is carried out. In addition, the total useful signal is limited by the total time in which a point target to be detected is seen by one pixel of the linear array. This time, also called the integration time, is in particular dependent on the rate at which the scene has to be scanned.

The present invention allows the aforementioned drawbacks to be remedied by proposing an optronic passive surveillance device allowing the use of a matrix detector and no longer a linear array.

More precisely, the invention proposes an optronic passive surveillance device, comprising a front optic of given useful instantaneous field, means for scanning a scene with a given total field of observation, means for forming the image of the scene and means for detecting said image. The device according to the invention is characterized in that the detection means comprise a two-dimensional matrix detector, the field of the detector along each of the dimensions being greater than or equal to said useful instantaneous field of the front optic along said dimension, and allowing the acquisition, for each elementary area of the scene corresponding to the useful instantaneous field of the front optic, of N subimages formed on said detector (N≧1), with a given integration time for each subimage, and in that the device includes counterscanning means to make it possible to compensate for the movements of the image that are due to the scanning of the scene during the acquisition of the N subimages.

Advantageously, several subimages are acquired for each elementary area of the scene, thereby making it possible to increase the signal-to-noise ratio of the detected image.

According to a preferred variant of the invention, the subimages are formed on different areas of the matrix detector so as to reduce the risk of error due to possible defects in the matrix detector.

Figure 2A:
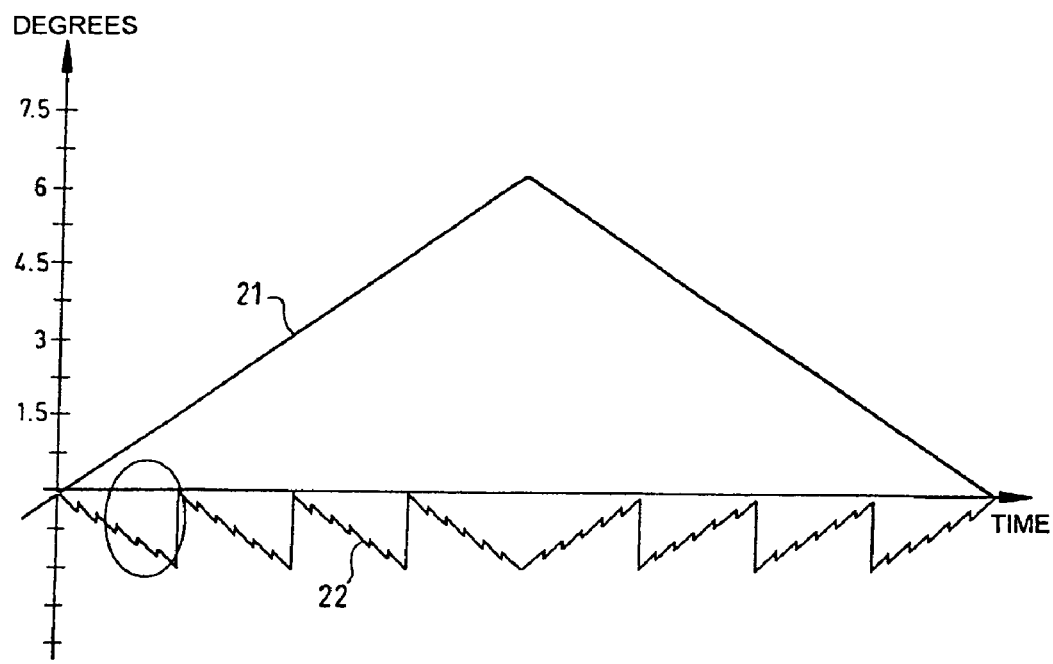
Figure 2B:
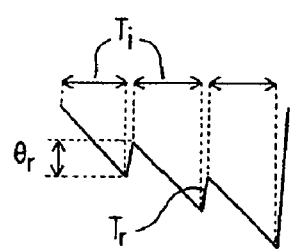
Figure 3:
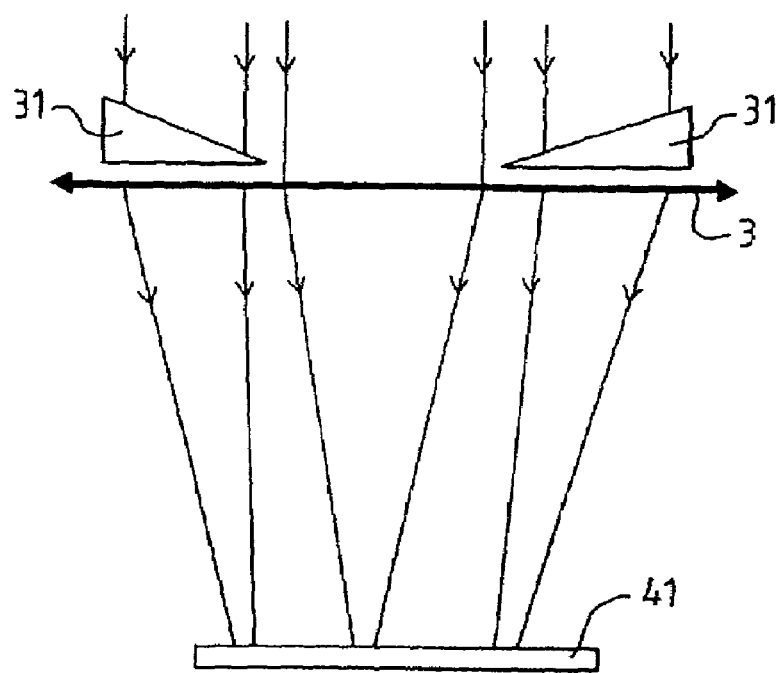

Other advantages and features will become more clearly apparent upon reading the description that follows, illustrated by the appended figures which show:

FIG. 1, a diagram of an example of a passive surveillance device according to the invention;

FIGS. 2A and 2B, diagrams illustrating the movements of the scanning and counterscanning means as a function of time in a given example;

FIG. 3, one embodiment of the device according to the invention; and

Figure 4:
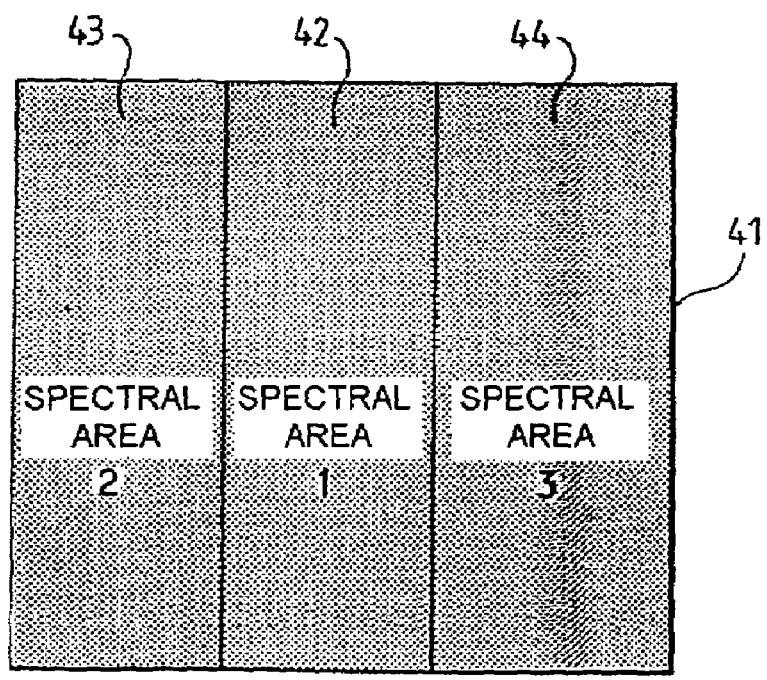

FIG. 4, an example of a matrix detector of the device according to the invention.

FIG. 1 shows the diagram of an example of a passive surveillance device according to the invention. This is, for example, an infrared surveillance device for detecting remote objects that are characterized by their infrared signature. The surveillance device comprises a front optic 1 of given instantaneous field and scanning means 2 allowing a scene to be observed with a given total field. The scanning means, the implementation of which is known from the prior art, are controlled by a processing unit 5 and allow the scene to be scanned in scanning patterns and with a given scan rate, these depending on the field to be observed and on other operational parameters. In the case of multispectral detection, the front optic and the scanning means may be formed, in a manner known per se, from a catadioptric system. The surveillance device also includes image formation means 3 and detection means 4, with a detector 41.

In the case of an infrared surveillance device, this is, for example, a detector sensitive in the 3–5 μm or 8–12 pim band, and cooled using known techniques. In both cases, a mercury cadmium tellurium (HgCdTe) compound may be used (with suitable compositions for the two bands). Other materials may be used, such as multiple quantum well materials in gallium arsenide/aluminum gallium arsenide (GaAs/AlGaAs) compounds. The compound indium antimonide (InSb) may also be used, but only in the 3–5 μm band.

According to the invention, the detector 41 is a two-dimensional matrix detector, the field of the detector along each of the dimensions being greater than or equal to the useful instantaneous field of the front optic along said dimension. Furthermore, the detection means allow acquisition, for each elementary area of the scene corresponding to the useful instantaneous field of the front optic, of N subimages formed on said detector (N≧1), with a given integration time for each subimage. The device according to the invention furthermore includes counterscanning means 6 that make it possible to compensate for the movements of the image that are due to the scanning of the scene during the acquisition of the N subimages. For example, the processing unit 5 synchronizes the acquisition of the subimages by the detection means with the movement of the counterscanning means 6. Thanks to the use of a matrix detector with a large number of pixels, the instantaneously observed field is greater and it is thus possible to take advantage of the time saved during scanning of the scene to acquire several subimages of one and the same elementary field. Advantageously, processing means are used to build up the information from the various subimages that will have "seen" the same point to be detected. Since this information comes from several independent subimages, any false alarms that may be generated, for example by noise coming from the electronics, may be reduced.

The counterscanning means 6 make it possible to compensate for the movements of the image of the observed scene that are due to the scanning by the device during acquisition of the N subimages. More precisely, since the subimage acquisition time is made up, on the one hand, of a detector integration time $T_i$ and, on the other hand, of a read time $T_r$, needed to read the information delivered by the matrix detector, the counterscanning means make it possible to keep the observed area fixed on the detector throughout the time needed to integrate the signal and thus avoid a "fuzzy" effect on the subimage.

FIG. 2A illustrates, according to one example, the angular movements of the scanning means 2 and the counterscanning means 6 in a given direction as a function of time. FIG. 2B is the enlargement of an area identified by a circle in FIG. 2A. Shown in FIG. 2A is a first curve 21 representing the angular movement of the scanning means 2 as a function of time. In this example, the amplitude of the total field of observation in the scanning direction is approximately plus or minus 6°. Curve 22 shows the angular movement of the counterscanning means 6 in the same direction as a function of time. This movement is detailed in FIG. 2B. In this example, it has been assumed that, for each elementary area of the scene corresponding to a 1.5° instantaneous field of the front optic, six subimages are acquired by the detection means. The counterscanning means impose a counterrotation movement on the scanning means and thus allow each subimage to be kept fixed on the matrix detector throughout the subimage integration time $T_i$ (FIG. 2B). After acquisition of the six subimages, the counterscanning means return to their initial position in order to restart the process with the next elementary area of the scene, the field of which is also 1.5°.

Advantageously, since the field of the matrix detector 41 along at least one of the scanning directions is strictly greater than the useful instantaneous field of the front optic along this dimension, the counterscanning means allow the formation of the subimages on different areas of the matrix detector; for example, these areas are shifted along this dimension by one or more pixels of said detector. This makes it possible to eliminate errors that might result from detector defects (nonuniformities, defective pixels, etc.). The subimage read time $T_r$ is used to advantage in order to implement this shift. Thus, in FIG. 2B, the angular movement $\theta_r$ of the counterscanning means during the read time $T_r$ shifts one subimage on the matrix detector relative to the previous subimage by a given number of pixels, for example one pixel.

The overall operation of the device according to the invention will be more clearly understood by explaining the following example in detail.

It will be assumed that the total field of observation is 18°×7.5° and the scan rate is 22°/s along the direction of the larger field (in this example, the direction in which it has to cover 18°). The matrix detector has standard dimensions of 240×320 pixels. In this example, the useful instantaneous field of the front optic is limited to 1.5°×7.5°, which corresponds to 64×320 pixels of the matrix detector. The subimage integration time is typically 3 ms (2 ms of integration time and 1 ms of read time). The area of observation is observed in successive 1.5°×7.5° fields, thus forming twelve successive elementary areas. Since the scan rate is 22°/s, the time per elementary area is 66 ms. It is therefore possible to acquire twenty-two subimages per elementary area. This therefore means that it is possible to "see" the point to be detected on the matrix detector twenty-two times and carry out signal processing operations, such as signal integration, for the purpose of reducing noise. This operation may be carried out using known techniques and, in this case, the signal-to-noise ratio may be improved by a factor of $22^{1/2}$. Each subimage is acquired thanks to the use of the counterscanning means that stabilize the image during the matrix integration time (2 ms). Advantageously, the counterscanning means are repositioned during the subimage read time (1 ms), resulting, for example, in a shift of 1 pixel along the matrix detector from one subimage relative to another. In this case, after 22 subimages, the point to be detected will be displaced by 22 pixels along the detector. The number of subimages that it is possible to build up per elementary area thus depends directly on the scan rate and on the total field to be scanned.

Taking the above illustrative example again, it may be seen that, even in the case where twenty-two subimages are acquired with a shift of one pixel each time, the size of the matrix used is 64+22, i.e. 86 pixels. In other words, over 240 pixels, 86 are used to scan an elementary area of the total field. According to a variant of the device according to the invention, with the matrix detector having a field greater than p times the useful instantaneous field of the front optic along at least one of its dimensions, p being an integer greater than or equal to 2, the surveillance device comprises means for projecting the image of an elementary area of the scene onto p separate areas of the matrix detector. In the previous example, it is thus possible to project the image of an elementary area onto three separate areas of the matrix detector. Thus, various areas of the matrix may be used to improve the detection performance. For example, attributes specific to the flux emitted by the objects present in the scene, such as the spectral signature or the polarisation, may be used to improve the detection performance.

For example, the projection means comprise a diffraction grating positioned approximately at the pupil of the image formation means. FIG. 3 shows another illustrative example, in which the projection means are formed from prisms 31 that are positioned approximately at the pupil of the image formation means 3 and allow the image of an elementary area of the scene to be projected onto various areas of the matrix detector 41.

According to a variant, the matrix detector areas thus defined are used to detect different spectral bands of the total spectral band observed. FIG. 4 thus shows, in the illustrative example described above, three different spectral areas 42, 43, 44. To obtain areas for different spectral bands, the detection means comprise, for example, band-pass filters positioned on the areas of the matrix detector and allowing image detection within given spectral bands. The matrix detector may also have a different spectral sensitivity in each of said areas. For example, the central area (area 42 in FIG. 4) detects the entire band and the two side areas (43, 44) detect the lower part and the upper part, respectively, of the sensitivity band of the matrix detector. According to a variant, the means for projection on different areas of the matrix detector may also perform both angular separation and wavelength filtering, using thick gratings or holograms, the properties of which are wavelength-sensitive. When prisms are used as projection means (see FIG. 3), band-pass filters may also be produced on the prisms themselves.

In particular in the case of infrared surveillance, the detected spectral bands may be chosen in such a way as to more finely characterize the nature of the object to be detected. For example, a man-made object may have different spectral characteristics from a natural object, whether moving or not. The detected spectral bands may also be chosen, using a known method (see, for example, French Patent Application FR 2 305 503), so as to evaluate the distance of the object from the origin of the detection system. This may be important, for example, in order to differentiate a small object located a short distance away from a larger object located a much greater distance away.

Another attribute that can be used is the polarisation characteristic of the received flux. In this case, the areas of the matrix detector, for example three in number, detect different components of the received polarization. This may also make it possible to differentiate a natural object from an artificial object (for example, a metal object). The same configuration as that described in FIG. 3 may be used to analyze the polarization attributes by inserting polarization analyzers on the deflection prisms 31.

Other variants may be envisioned so as to improve detection. For example, it is possible to couple the spectral band and polarization aspects.

In an additional variant of the invention, the projection means are retractable, in such a way as to be able to pass either from a single-attribute operating mode to a multiple-attribute mode.

The invention claimed is:

1. An optronic passive surveillance device, comprising:
   a front optic having a useful instantaneous field;
   a scanning device to observe a scene with a given total field of observation;
   means for forming the image of the scene;
   a two-dimensional matrix detector for detecting said image; and
   counterscanning means in which the field of the detector along each of the dimensions being greater than or equal to said useful instantaneous field of the front optic along said dimension, and allows the acquisition, for each elementary area of the scene corresponding to the useful instantaneous field of the front optic, of N subimages formed on said detector N≧1, with a given integration time for each subimage, and in which the counterscanning means to make it possible to compensate for the movements of the image that are due to the scanning of the scene during the acquisition of the N subimages.

2. The device as claimed in claim 1, in which the number of subimages acquired for each elementary area of the scene is greater than or equal to 2, said device including a unit for processing said subimages.

3. The device as claimed in claim 1, wherein the field of the detector is approximately equal to the instantaneous field in a first direction, greater than three times the instantaneous field along the second direction, and in that the number of subimages acquired for each elementary area of the scene is around twenty.

4. The device as claimed in claim 1, in which the number of subimages acquired for each elementary area of the scene is greater than or equal to 2 and in the field of the detector along at least one of its dimensions being strictly greater than the useful instantaneous field of the front optic along said dimension, the counterseanning means are furthermore used to form subimages on different areas of the matrix detector.

5. The device as claimed in claim 3, in which said areas are shifted along one of the dimensions of the matrix detector by one or more pixels of said detector.

6. The device as claimed in claim 1, wherein the matrix detector is sensitive in the 8–12 μm band.

7. The device as claimed in claim 6, wherein the matrix detector is formed with materials based on HgCdTe compounds or materials of the multiple quantum-well type.

8. The device as claimed in claim 1, wherein the matrix detector is sensitive in the 3–5 μm band.

9. The device as claimed in claim 8, wherein the matrix detector is formed with materials based on HgCdTe compounds or materials of the multiple quantum-well type.

10. The device as claimed in claim 8, wherein the matrix detector is formed with InSb-based materials.

11. The device as claimed in claim 1, wherein the matrix detector has a field greater than p times the useful instantaneous field of the front optic along at least one of its dimensions, p being an integer greater than or equal to 2, it includes means for projecting the image of an elementary area of the scene corresponding to said useful instantaneous field onto p separate areas of the matrix detector.

12. The device as claimed in claim 11, wherein said projection means are retractable.

13. The device as claimed in claim 11, wherein each of the projected images is characterized by a given polarization attribute.

14. The device as claimed in claim 13, wherein the projection means are formed from prisms positioned approximately at the pupil of the image formation means and in that polarization analyzers are placed on the exit side of each of the prisms so as to assign said polarization attribute to each of said projected images.

15. The device as claimed in claim 11, wherein each of the projected images is characterized by a given spectral band.

16. The device as claimed in claim 15, wherein the matrix detector has a separate spectral sensitivity in each of said p areas, allowing the detection of p images in p given spectral bands.

17. The device as claimed in claim 15, wherein the device includes band-pass filters positioned on said p areas of the matrix detector, allowing the detection of p images in p given spectral bands.

18. The device as claimed in claim 15, wherein the projection means comprise a diffraction grating positioned approximately at the pupil of the image formation means.

19. The device as claimed in claim 15, wherein the projection means are formed from prisms positioned approximately at the pupil of the image formation means.

20. The device as claimed in claim 19, wherein band-pass filters are produced on the prisms.

* * * * *